United States Patent [19]

Foster

[11] Patent Number: 5,582,727
[45] Date of Patent: Dec. 10, 1996

[54] APPARATUS FOR CLEANING DRILLING MUD

[76] Inventor: Mike L. Foster, 22807 Capital Landing, Katy, Tex. 77449

[21] Appl. No.: 504,561

[22] Filed: Jul. 20, 1995

[51] Int. Cl.$^6$ .................................................. B01D 21/26
[52] U.S. Cl. .................. 210/258; 210/257.1; 210/297; 210/388; 210/512.2; 209/322; 209/332; 209/711; 209/728
[58] Field of Search ............................... 210/512.2, 258, 210/297, 298, 388; 209/17, 322, 328, 332, 711, 728

[56] References Cited

U.S. PATENT DOCUMENTS

| | | | |
|---|---|---|---|
| 3,723,309 | 3/1973 | Garcia | 210/512.2 |
| 3,899,414 | 3/1973 | Hansen | 209/17 |
| 4,462,416 | 7/1984 | George et al. | 134/34 |
| 4,634,535 | 1/1987 | Lott | 210/512.2 |
| 4,670,139 | 6/1987 | Spruiell et al. | 210/512.2 |

*Primary Examiner*—David A. Reifsnyder
*Attorney, Agent, or Firm*—Kenneth A. Roddy

[57] ABSTRACT

An apparatus and method for cleaning, desanding, and desilting drilling mud which contains unwanted solids utilizes an enclosure divided into a plurality of compartments connected with a system of vibratory screen shaker separators, desanders, and desilters. Drilling mud is separated by a primary vibratory shaker into coarse solids which is discarded and screened liquid mud which enters a first compartment and is further separated by a desander cyclone into a lighter liquid mud faction and a heavier liquid mud faction. The lighter faction is sent back to the first compartment and recycles, the heavier faction is further separated by a second vibratory shaker and enters a second compartment, and the solids are discarded. The liquid mud from the second compartment is further separated by manifolded desilter cyclones into a heavier faction and a lighter faction. The lighter faction is sent back to the second compartment and recycles, the heavier faction is further separated by a third vibratory shaker and enters a third compartment, and the solids are discarded. The liquid mud from the third compartment is further separated by a high-speed desilter cyclone into a heavier faction and a lighter faction. The lighter faction is sent back to the third compartment and recycles, the heavier faction is further separated by a fourth vibratory screen shaker into desilted dry solids and desilted liquid mud. The four times screened, desanded and twice desilted liquid mud is then used in the active mud system.

8 Claims, 2 Drawing Sheets

APPARATUS FOR CLEANING DRILLING MUD

BACKGROUND OF THE INVENTION

1. Field of the Invention

This invention relates generally to drilling fluid cleaning systems, and more particularly to an apparatus and method for cleaning drilling mud which traps and isolates the mud so that solids of particular particle size in the mud are processed and removed in successive adjacent closed loop systems wherein each successive section of the system removes finer and finer solids until the mud reaches the desired properties.

2. Brief Description of the Prior Art

Effective control of solids in drilling mud in drilling mud systems has been a goal for the industry for many years. Some systems work better than others to achieve this goal.

To obtain the desired results that would give higher penetration rates, less contamination of formations, lower mud costs and less abrasives in the mud system to cause premature failure in rig equipment, many different systems have been tried, usually with poor to moderate results.

The systems that work best have a tremendous amount of very expensive and complicated machinery and require personnel to monitor the equipment and keep it working. If the operation requires dry solids from the system, even more equipment is required.

George et al, U.S. Pat. No. 4,462,416 discloses a method and apparatus for washing drilling cuttings which utilizes a pair of substantially common elevation tank compartments which include lower sump portions and a first tank compartment includes an inlet pipe portion for admitting drilling cuttings in a downward direction into the first tank compartment. The inlet pipe portion includes at least one lateral cleaning fluid jet and the first tank compartment includes additional horizontal cleaning fluid jets for directing jets of cleaning fluid through the drilling cuttings as they are admitted into the first tank compartment and subsequently directing jets of cleaning fluid through the cleaning fluid and drilling cuttings within the first tank compartment below the liquid level therein. The upper portion of the second tank compartment includes a vibratory screen-type separator positioned thereover and structure is provided for pumping fluent material from the sump of the first tank compartment to the separator whereby the larger size, cleaned cuttings will be separated from the other fluent material which passes downwardly through the separator and into the cleaning fluid within the second tank compartment.

Spruiell et al, U.S. Pat. No. 4,670,139 discloses a machine for cleaning drilling muds comprising a centrifuge desander operatively connected to a plurality of cooperating conical desilters to remove gases and separate materials of varying densities. Muds containing solid materials are pumped from the cleaning bed into an initial cyclone chamber, where, under increasing centrifugal force, the processed mud is separated into relatively heavier and lighter components, which are transmitted via separate pathways to twin chambers in the lower level compartment of a particle separating drum. The first chamber of the drum receives heavier materials and transmits them to a large desander cone where the heaviest impurities are removed; the second drum chamber receives the lighter components which are further separated and delivered to a network of desilter cones which output properly cleansed mud. The purified output of the large desander cone is transmitted directly back into the cleaning bed reservoir. Freed air and gasses are discharged at controlled rates to be burned or dispersed into the environment through a third stage, which is in fluid flow communication with the initial stage and the desilter stage.

The present invention is distinguished over the prior art in general, and these patents in particular by an apparatus and method for cleaning, desanding, and desilting drilling mud that contains unwanted solids which utilizes an enclosure divided into a plurality of compartments connected with a system of vibratory screen shaker separators, desanders, and desilters. Drilling mud is separated by a primary vibratory shaker into coarse solids which are discarded and screened liquid mud which enters a first compartment and is further separated by a desander cyclone into a lighter liquid mud faction and a heavier liquid mud faction. The lighter faction is sent back to the first compartment and recycles, the heavier faction is further separated by a second vibratory shaker and enters a second compartment, and the solids are discarded. The liquid mud from the second compartment is further separated by manifolded desilter cyclones into a heavier faction and a lighter faction. The lighter faction is sent back to the second compartment and recycles, the heavier faction is further separated by a third vibratory shaker and enters a third compartment, and the solids are discarded. The liquid mud from the third compartment is further separated by a high-speed desilter cyclone into a heavier faction and a lighter faction. The lighter faction is sent back to the third compartment and recycles, the heavier faction is further separated by a fourth vibratory screen shaker into desilted dry solids and desilted liquid mud. The four times screened, desanded and twice desilted liquid mud is then used in the active mud system.

SUMMARY OF THE INVENTION

It is therefore an object of the present invention to provide an apparatus and method for cleaning, desanding, and desilting drilling mud that contains unwanted solids.

It is another object of this invention to provide an apparatus and method for cleaning drilling mud which provides significantly low abrasives in the mud system and results in higher penetration rates, less contamination of formations, lower mud costs.

Another object of this invention is to provide an apparatus and method for cleaning drilling mud which will significantly reduce premature failure in rig equipment.

Another object of this invention is to provide an apparatus and method for cleaning drilling mud which is not complex and does not require trained personnel to monitor the equipment.

Another object of this invention is to provide an apparatus and method for cleaning drilling mud which traps and isolates the mud so that each particle sized solids in the mud can be processed completely in a closed system before it is displaced into the next processing stage by mud entering the system from the well bore.

Another object of this invention is to provide an apparatus and method for cleaning drilling mud which will remove specifically sized solids before they can be carried down stream in the system.

Another object of this invention is to provide an apparatus and method for cleaning drilling mud wherein each successive section of the system removes finer and finer solids until mud properties reach the desired specifications.

A further object of this invention is to provide an apparatus and method for cleaning drilling mud which will allow the operator to screen the solids equipment for specific micron sized particles to obtain dry solids as discharged and not blind the screens.

A still further object of this invention is to provide an apparatus and method for cleaning drilling mud which is simple in construction, economical to manufacture and reliable in operation.

Other objects of the invention will become apparent from time to time throughout the specification and claims as hereinafter related.

The above noted objects and other objects of the invention are accomplished by an apparatus and method for cleaning, desanding, and desilting drilling mud that contains unwanted solids which utilizes an enclosure divided into a plurality of compartments connected with a system of vibratory screen shaker separators, desanders, and desilters. Drilling mud is separated by a primary vibratory shaker into coarse solids which is discarded and screened liquid mud which enters a first compartment and is further separated by a desander cyclone into a lighter liquid mud faction and a heavier liquid mud faction. The lighter faction is sent back to the first compartment and recycles, the heavier faction is further separated by a second vibratory shaker and enters a second compartment, and the solids are discarded. The liquid mud from the second compartment is further separated by manifolded desilter cyclones into a heavier faction and a lighter faction. The lighter faction is sent back to the second compartment and recycles, the heavier faction is further separated by a third vibratory shaker and enters a third compartment, and the solids are discarded. The liquid mud from the third compartment is further separated by a high speed desilter cyclone into a heavier faction and a lighter faction. The lighter faction is sent back to the third compartment and recycles, the heavier faction is further separated by a fourth vibratory screen shaker into desilted dry solids and desilted liquid mud. The four times screened, desanded and twice desilted liquid mud is then used in the active mud system.

DESCRIPTION OF THE PREFERRED EMBODIMENT

Figure 1:
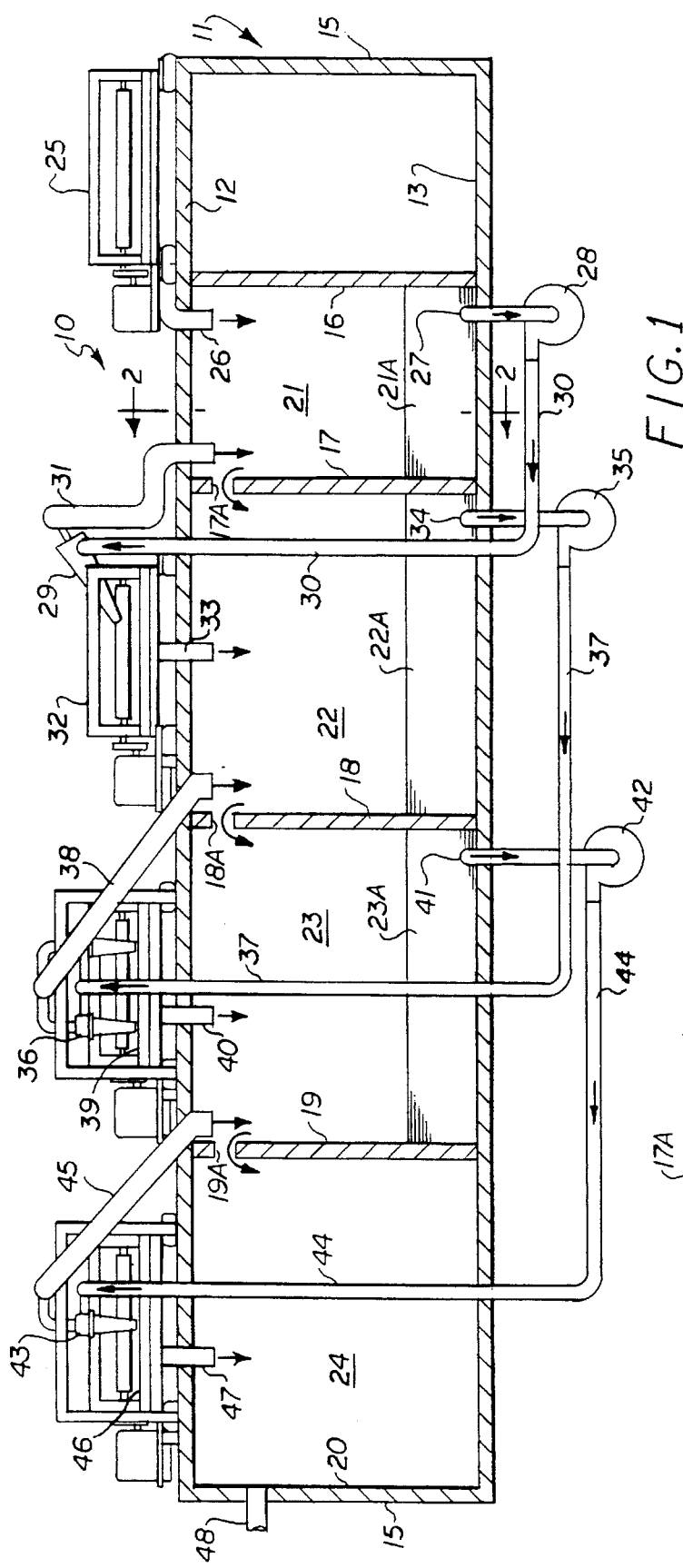
FIG. 1 is a side elevation showing the apparatus in accordance with the present invention somewhat schematically.
Figure 2:
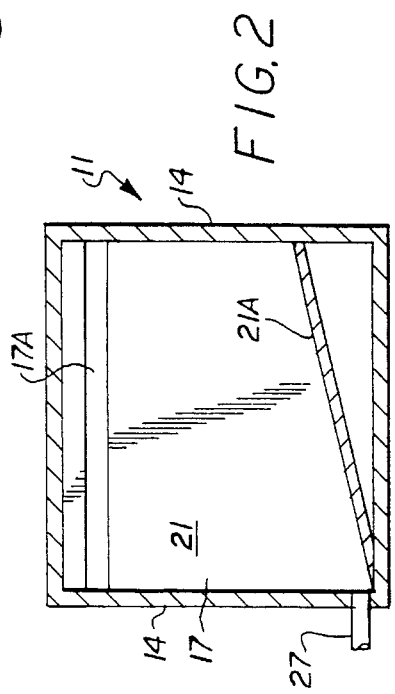
FIG. 2 is a cross section through one of the solids trap compartments taken along line 2—2 of FIG. 1, showing the angled bottom wall of the compartment.

Referring to the drawings by numerals of reference, there is shown in FIGS. 1 and 2, a preferred system of apparatus 10 for cleaning drilling mud. A large tank 11 having a top wall 12, bottom wall 13, opposed side walls 14, and opposed end walls 15 is divided into compartments by interior vertical walls 16, 17, 18, 19, and 20. The compartments are designated by numerals 21, 22, 23, and 24. The compartments 21, 22, and 23 each have an inclined bottom wall 21A, 22A, and 23A, respectively, which slopes angularly downwardly from one side wall to the other. The vertical wall 17 separates compartments 21 and 22, wall 18 separates compartments 22 and 23, and wall 19 separates compartments 23 and 24. Vertical walls 17, 18, and 19 each have an opening 17A, 18A, and 19A, respectively, a short distance beneath the top wall 12. The openings 17A, 18A, and 19A serve as spillways between the adjacent compartments.

A primary shale shaker 25 is mounted on the top wall 12 of the tank 11 near one end. The primary shale shaker 25 is a vibrating screen shale shaker conventional in the art, and is therefore represented schematically. The primary shale shaker 25 has the usual mesh screen or screens and eccentrically weighted rotating shaft or shafts which remove solids of a predetermined size range and transport cuttings across the screen in a vibratory motion. The inlet end of the primary shale shaker 25 receives liquid mud and cuttings from the drilling rig and solids larger than the screen mesh are conveyed to the discharge end of the shaker and deposited outside the tank 11 in a waste tank (not shown). The liquid discharge of the primary shale shaker 25 is connected to the compartment 21 by an inlet conduit 26. After passing through the screens of the primary shaker, the screened liquid mud containing particles smaller than the screen mesh enter the compartment 21 through the inlet conduit 26. An outlet conduit 27 extends through the side wall 14 of the compartment 21 near the lower end of the inclined bottom wall 21A. The suction end of a centrifugal pump 28 is connected to the outlet conduit 27. The angled bottom wall 21A facilitates the collection of heavier solids at the pump intake.

A desander 29 is mounted on the top wall 12 of the tank 11 adjacent the primary shaker 25. The desander 29 is conventional in the art, and therefore is represented schematically. The desander 29 preferably is a hydrocyclone larger than about 5" in diameter. "Hydrocyclones" are also known in the art as "cyclones" or "cones", which consist of a conical shell with a small discharge opening at the bottom for underflow discharge, a larger liquid discharge opening at the top for liquid discharge, and a feed nozzle on the side of the body near the top of the cone. The feed nozzle of the desander 29 is connected to the discharge end of the pump 28 by conduit 30. The liquid discharge at the top of the desander 29 is connected back into the compartment 21 by conduit 31 which passes through the top wall 12 of the tank into the compartment 21 and terminates near the opening 17A in the vertical wall 17.

As explained hereinafter, the discharge of liquid from the desander 29 creates a pressure dam and prevents heavier liquid mud and cuttings in compartment 21 from passing through the opening 17A into compartment 22 and causes the heavier liquid mud and cuttings in compartment 22 circulate in a closed loop until they are processed to a particular size range and displaced through the opening 17A by the heavier liquid mud and cuttings entering the compartment from the primary shaker 25.

The underflow discharge of the desander 29 is positioned at the inlet end of a second vibrating screen shale shaker 32. Liquid mud from the compartment 21 enters the desander 29 under pressure from the centrifugal pump 28 and lighter solids and the liquid phase of the mud moves inward and upward in a spiraling vortex and are discharged back into the compartment 21. The heavier, coarse solids and the liquid mud around them spiral outward and downward and are discharged through the underflow discharge onto the screen of the shale shaker 32. The inlet end of the shale shaker 32 receives the liquid mud and heavier, coarse solids from the desander 29. Solids larger than the screen mesh are conveyed to the discharge end of the shaker 32 and deposited outside the tank 11 in a waste tank (not shown). The liquid discharge of the shale shaker 32 is connected to the compartment 22 by an inlet conduit 33. After passing through the screens of the shaker 32, liquid mud and solids smaller than the screen mesh enter the compartment 22 through the inlet conduit 33. An outlet conduit 34 extends through the side wall 14 of the compartment 22 near the lower end of the inclined wall 22A. The suction end of a centrifugal pump 35 is connected to the outlet conduit 34. The angled bottom wall 22A facilitates the collection of heavier solids at the pump intake.

A desilter 36 is mounted on the top wall 12 of the tank 11 adjacent the desander 29 and shaker 32. The desilter 36 is conventional in the art, and therefore is represented schematically. The desilter 36 uses smaller multiple hydrocyclones in a manifold system and removes smaller particles by separating the liquid mud into lighter and heavier mud factions. The feed nozzle of the desilter manifold 36 is connected to the discharge end of the pump 35 by conduit 37. The liquid discharge at the top of the desilter manifold 36 is connected back into the compartment 22 by conduit 38 which passes through the top wall 12 of the tank into the compartment 21 and terminates near the opening 18A in the vertical wall 18.

As explained hereinafter, the discharge of liquid from the desilter 36 creates a pressure dam and prevents heavier liquid mud and cuttings in compartment 22 from passing through the opening 18A into compartment 23 and causes the heavier liquid mud and cuttings in compartment 22 to circulate in a closed loop until they are processed to a particular size range and displaced through the opening 18A by the heavier liquid mud and cuttings entering the compartment from the shaker 32 and overflow from compartment 21.

The underflow discharge ends of the desilter 36 are positioned at the inlet end of a third vibrating screen shale shaker 39. Liquid mud from the compartment 22 enters the desilter 34 under pressure from the centrifugal pump 35 and lighter solids and the liquid phase of the mud moves inward and upward in a spiraling vortex and are discharged back into the compartment 22. The heavier, coarse solids and the liquid mud around them spiral outward and downward and are discharged through the underflow discharge onto the screen of the shale shaker 39. The inlet end of the shale shaker 39 receives the liquid mud and heavier, coarse solids from the desilter 36. Solids larger than the screen mesh are conveyed to the discharge end of the shaker 39 and deposited outside the tank 11 in a waste tank (not shown). The liquid discharge of the shale shaker 39 is connected to the compartment 23 by an inlet conduit 40. After passing through the screens of the shaker 39, liquid mud and solids smaller than the screen mesh enter the compartment 23 through the inlet conduit 40. An outlet conduit 41 extends through the side wall 14 of the compartment 22 near the lower end of the inclined bottom wall 23A. The suction end of a centrifugal pump 42 is connected to the outlet conduit 41. The angled bottom wall 23A facilitates the collection of heavier solids at the pump intake.

A high-speed desilter 43 is mounted on the top wall 12 of the tank 11 adjacent the desilter 36 and shaker 39. The high-speed desilter 43 is conventional in the art, and therefore is represented schematically. The high-speed desilter 43 operates at a high velocity and removes still smaller particles. The feed nozzle of the high-speed desilter 43 is connected to the discharge end of the pump 42 by conduit 44. The liquid discharge at the top of the high speed desilter 43 is connected back into the compartment 23 by conduit 45 which passes through the top wall 12 of the tank into the compartment 23 and terminates near the opening 19A in the vertical wall 19.

As explained hereinafter, the discharge of liquid from the high-speed desilter 43 creates a pressure dam and prevents heavier liquid mud and cuttings in compartment 23 from passing through the opening 19A into compartment 24 and causes the heavier liquid mud and cuttings in compartment 23 to circulate in a closed loop until they are processed to a particular size range and displaced through the opening 19A by the heavier liquid mud and cuttings entering the compartment from the shaker 39 and overflow from compartment 22.

The underflow discharge end of the high-speed desilter 43 is positioned at the inlet end of a fourth vibrating screen shale shaker 46. Drilling mud from the compartment 23 enters the high-speed desilter 43 under pressure from the centrifugal pump 42 and lighter solids and the liquid phase of the mud moves inward and upward in a spiraling vortex and are discharged back into the compartment 23. The heavier solids and the liquid mud around them spiral outward and downward and are discharged through the underflow discharge onto the screen of the shale shaker 46. The inlet end of the shale shaker 46 receives the liquid mud and heavier, coarse solids from the high-speed desilter 43. Solids larger than the screen mesh are conveyed to the discharge end of the shaker 46 and deposited outside the tank 11 in a waste tank (not shown). The liquid discharge of the shale shaker 46 is connected to the compartment 24 by an inlet conduit 47. After passing through the screens of the shaker 46, liquid mud and solids smaller than the screen mesh enter the compartment 24 through the inlet conduit 47.

Compartment 24 serves as a reservoir for the active mud system. An outlet conduit 48 extends through the side wall 14 of the compartment 24 near the top end of the end wall 15. A conventional pump (not shown) may be connected to the outlet conduit 48 to pump the cleaned drilling mud to the drilling rig.

OPERATION

Figure 3:
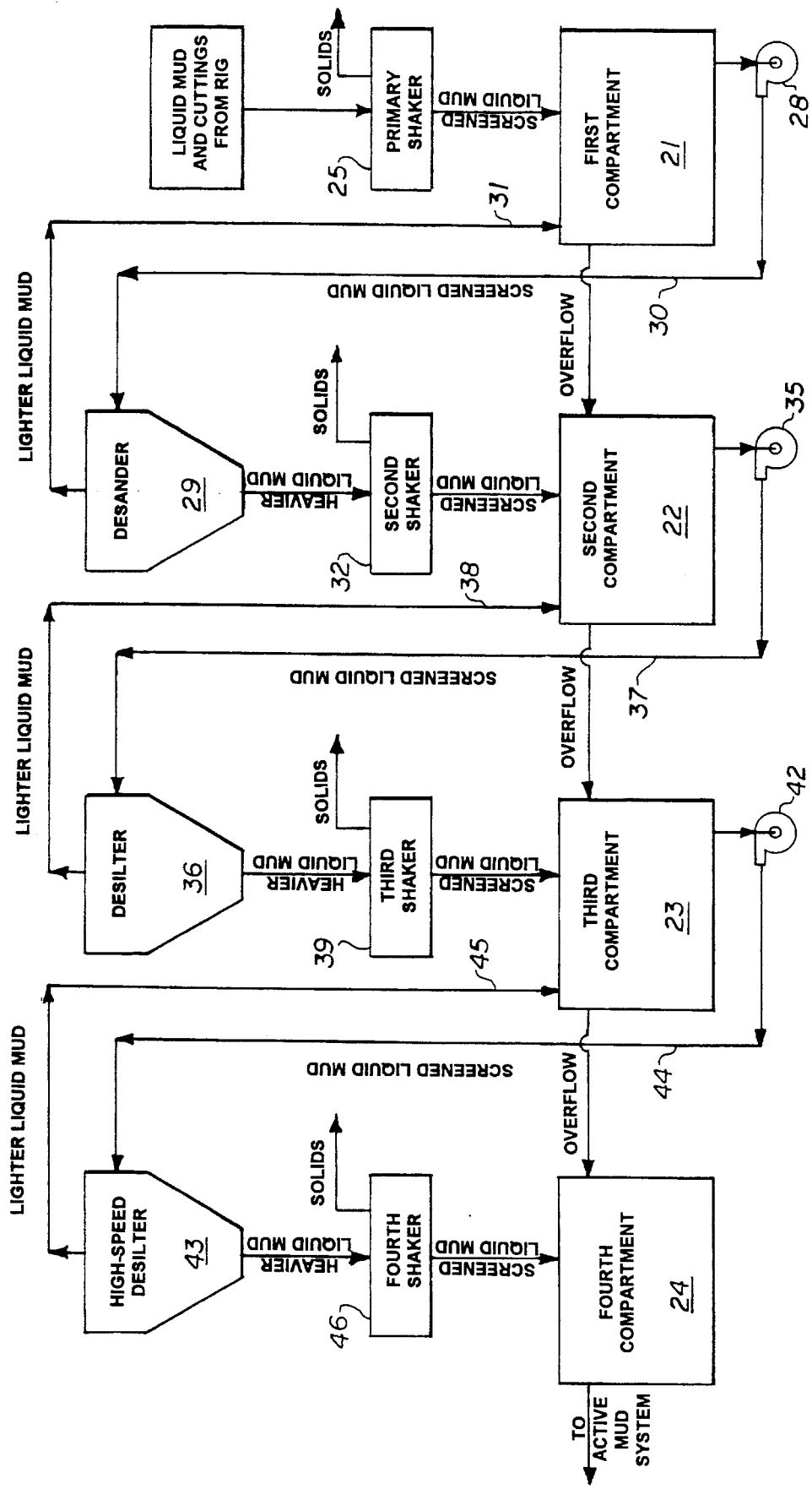
FIG. 3 is a flow diagram illustrating the process in accordance with the present invention.

Referring additionally to FIG. 3, the mud cleaning process will be described. Drilling mud which contains unwanted solids (cuttings) from the drilling rig is introduced into the primary shaker 25. The primary shaker 25 separates the drilling mud and cuttings into coarse solids larger than the screen mesh and screened liquid mud containing particles smaller than the screen mesh. The coarse solids are conveyed to the discharge end of the shaker 25 and transported to a waste tank (not shown). The screened liquid mud containing particles smaller than the screen mesh enter the first compartment 21 and are pumped under pressure by the centrifugal pump 28 to the desander 29.

The once screened liquid mud is further separated in the cyclone chamber of the desander 29 into a lighter liquid mud faction and a heavier liquid mud faction. The lighter liquid mud faction is discharged back into the first storage compartment 21. As shown in FIG. 1, the end of the conduit 31 from the desander 29 overflow discharge is disposed closely adjacent the opening 17A between the first and second compartments 21 and 22 to direct the lighter liquid mud faction downwardly past the opening 17A in the wall 17. The lighter liquid mud faction is discharged from the desander 29 downwardly into the first compartment 21 at a higher pressure than the liquid mud discharged into the compartment by the primary shaker 21. This in effect creates a pressure dam whereby the liquid mud from the primary shaker 21 is prevented from passing through the opening 17A by the downwardly directed lighter mud faction entering at a higher pressure. In the compartment 21, the heavier particles in the liquid mud settle to the bottom and are drawn out by the pump and processed by the desander in a closed loop while the lighter particles and liquid is displaced to a higher level sufficient to overflow through the opening 17A into the second compartment 22. Thus, the heavier liquid mud is recycled until the particle size is sufficient to escape the loop by overflowing into the second compartment.

The heavier liquid mud faction from the desander 29 is discharged onto the screen of the second vibratory shaker 32. The shaker 32 separates the heavier liquid mud faction into solids larger than the screen mesh and screened liquid mud containing particles smaller than the screen mesh. The solids are conveyed to the discharge end of the shaker 32 and transported to a waste tank. The screened liquid mud containing particles smaller than the screen mesh enter the second compartment 22 and are pumped under pressure by the centrifugal pump 35 to the desilter 36.

The twice screened and desanded liquid mud is further separated in the manifolded cyclone chambers of the desilter 36 into a lighter liquid mud faction and a heavier liquid mud faction. The lighter liquid mud faction is discharged back into the second compartment 22. As described above, with reference to FIG. 1, the lighter mud faction is discharged from the desilter 36 downwardly into the second compartment 22 closely adjacent the opening 18A in the wall 18 between the second and third compartments 22 and 23 at a higher pressure than the liquid mud discharged into the compartment by the second shaker 32 and the overflow from compartment 21 to prevent the heavier particles in the second compartment 22 from passing through the opening 18A. In the compartment 22, the heavier particles in the liquid mud settle to the bottom and are drawn out by the pump and processed by the desilter 36 in a closed loop while the lighter particles and liquid is displaced to a higher level sufficient to overflow into the third compartment 23. The heavier liquid mud is recycled until the particle size is sufficient to escape the loop by overflowing into the third compartment 23.

The heavier liquid mud faction from the desilter 36 is discharged onto the screen of the third vibratory shaker 39. The shaker 39 separates the heavier liquid mud faction into solids larger than the screen mesh and screened liquid mud containing particles smaller than the screen mesh. The solids are conveyed to the discharge end of the shaker 39 and transported to a waste tank. The screened liquid mud containing particles smaller than the screen mesh enter the third compartment 23 and are pumped under pressure by the centrifugal pump 42 to the high-speed desilter 43.

The thrice screened, desanded, and desilted liquid mud is further separated in the cyclone chamber of the high-speed desilter 43 into a lighter liquid mud faction and a heavier liquid mud faction. The lighter liquid mud faction is discharged back into the third compartment 23. The lighter mud faction is discharged from the desilter 36 downwardly into the third compartment 23 closely adjacent the opening 19A in the wall 19 between the third and fourth compartments 23 and 24 at a higher pressure than the liquid mud discharged into the compartment by the third shaker 39 and the overflow from compartment 22 to prevent the heavier particles in the third compartment 23 from passing through the opening 18A. In the compartment 23, the heavier particles in the liquid mud settle to the bottom and are drawn out by the pump and processed by the high-speed desilter 43 in a closed loop while the lighter particles and liquid is displaced to a higher level sufficient to overflow into the fourth compartment 24. The heavier liquid mud is recycled until the particle size is sufficient to escape the loop by overflowing into the fourth compartment 24.

The heavier liquid mud faction from the high-speed desilter 43 is discharged onto the screen of the fourth vibratory shaker 46. The shaker 46 separates the heavier liquid mud faction into substantially dry solids larger than the screen mesh and screened liquid mud containing particles smaller than the screen mesh. The dry solids are conveyed to the discharge end of the shaker 46 and transported to a waste tank. The screened liquid mud containing particles smaller than the screen mesh enter the fourth compartment 24. The lighter liquid mud from the third compartment 23, after being recycled through the high-speed desilter 43 in a closed loop until sufficiently fine, overflows into the fourth compartment 24.

The liquid mud in the fourth compartment 24 has been screened four times, desanded, and desilted twice and may be pumped to the active mud system for use in the drilling operations.

The present system traps and isolates the mud so that each particle size solids in the mud can be processed completely in a closed system before it is displaced into the next compartment by mud entering the system from the well bore.

By confining the mud in a small place and processing it through mud cleaning equipment designed to remove specifically sized solids before they can be carried down stream in the system. Each successive section of the system removes finer and finer solids until mud properties reach the desired specifications. Another benefit of the present system is that it allows the operator to screen the solids equipment for specific micron sized particles to obtain dry solids as discharged and not blind screens. The present system can be operated by the rig crew without requiring additional personnel to monitor the equipment.

Tests have shown that drilling mud processed by the present mud cleaning system has no sand content or only a trace of sand and has a solids content as low as theoretically possible for each required mud weight. Cuttings are dry without the addition of fly ash or other chemicals to dry them. The absence of abrasives in the drilling mud has led to longer life on pump parts and related equipment.

While this invention has been described fully and completely with special emphasis upon a preferred embodiment, it should be understood that within the scope of the appended claims the invention may be practiced otherwise than as specifically described herein.

I claim:

1. An apparatus for cleaning, desanding, and desilting liquid drilling mud which contains unwanted solids comprising:

an enclosure divided into a first, a second, and a third compartment;

a first vibratory screen separator having a mesh screen for receiving liquid drilling mud having unwanted solids and separating it into coarse solids larger than the screen mesh and once screened liquid mud containing particles smaller than the screen mesh, solids discharge means for discharging said coarse solids, and liquid mud discharge means connected with said first compartment for discharging said once screened liquid mud into said first compartment;

first pump means having an intake in fluid communication with said first compartment;

desanding means including a cyclone chamber having an inlet connected with said first pump means for receiving said once screened liquid mud from said first compartment and further separating it into a lighter once screened and desanded liquid mud and a heavier once screened and desanded liquid mud, a liquid mud, overflow discharge means connected with said first compartment for discharging said lighter once screened and desanded liquid mud back into said first compartment, and an underflow discharge means for discharging said heavier once screened and desanded liquid mud;

a second vibratory screen separator having a mesh screen for receiving said heavier once screened and desanded liquid mud from said desanding means and further separating it into twice screened and desanded solids larger than the screen mesh of said second separator and twice screened and desanded liquid mud containing solids smaller than the screen mesh of said second separator, solids discharge means for discharging said twice screened and desanded solids, and liquid mud discharge means for discharging said twice screened and desanded liquid mud into said second compartment;

second pump means having an intake in fluid communication with said second compartment;

first desilting means including at least one cyclone chamber having an inlet connected with said second pump means for receiving said twice screened and desanded liquid mud from said second compartment and further separating it into a heavier twice screened, desanded and desilted liquid mud and a lighter twice screened, desanded and desilted liquid mud, a liquid mud overflow discharge means connected with said second compartment for discharging said lighter twice screened, desanded and desilted liquid mud back into said second compartment, and an underflow discharge means for discharging said heavier twice screened, desanded and desilted liquid mud;

a third vibratory screen separator having a mesh screen for receiving said heavier twice screened, desanded and desilted liquid mud from said first desilting means and further separating it into thrice screened, desanded and desilted solids larger than the screen mesh of said third separator and thrice screened, desanded and desilted liquid mud containing solids smaller then the screen mesh of said third separator, solids discharge means for discharging said thrice screened, desanded and desilted solids, and liquid mud discharge means for discharging said thrice screened, desanded and desilted liquid mud into said third compartment;

third pump means having an intake in fluid communication with said second compartment;

second desilting means including at least one cyclone chamber having an inlet connected with said third pump means for receiving said thrice screened, desanded and desilted liquid mud from said second compartment and further separating it into a heavier thrice screened, desanded and twice desilted liquid mud and a lighter thrice screened, desanded and twice desilted liquid mud, a liquid mud overflow discharge means connected with said third compartment for discharging said lighter thrice screened, desanded and twice desilted liquid mud back into said third compartment, and an underflow discharge means for discharging said heavier thrice screened, desanded and twice desilted liquid mud; and a fourth vibratory screen separator having a mesh screen for receiving said heavier thrice screened, desanded and twice desilted liquid mud from said second desilting means and further separating it into four times screened, desanded and twice desilted solids of a size larger than the screen mesh of said fourth separator and four times screened, desanded and twice desilted liquid mud containing solids smaller then the screen mesh of said third separator, solids discharge means for discharging said four times screened, desanded and twice desilted solids, and liquid mud discharge means for discharging said four times screened, desanded and twice desilted liquid mud.

2. The apparatus according to claim 1 wherein said first and second compartments are separated by a first common wall having a first opening between said first and second compartments at a predetermined level and said second and third compartments are separated by a second common wall having a second opening between said second and third compartments at a predetermined level;

said liquid mud overflow discharge means of said desanding means has an outlet end disposed in said first compartment closely adjacent said first opening between said first and said second compartments to direct said lighter once screened and desanded liquid mud past said first opening; and said lighter once screened and desanded liquid mud is discharged from said desanding means into said first compartment at a higher pressure than said once screened liquid mud discharged into said first compartment by said first vibratory screen separator; whereby said once screened liquid mud is prevented from passing through said first opening by said discharged lighter once screened and desanded liquid mud and settles to a surface of said first compartment to be drawn therefrom by said pump means and processed by said desander in a closed loop while said lighter once screened and desanded liquid mud is displaced and passes through said first opening into said second compartment.

3. The apparatus according to claim 2 wherein said first compartment has an inclined wall and a conduit having one end disposed near said inclined wall and another end connected with said first pump means intake to facilitate the evacuation of said once screened liquid mud from said first compartment.

4. The apparatus according to claim 2 wherein said lighter once screened and desanded liquid mud entering said second compartment through said first opening is mixed with said twice screened and desanded liquid mud discharged into said second compartment by said second vibratory screen separator;

said liquid mud overflow discharge means of said first desilting means has an outlet end disposed in said first compartment closely adjacent said second opening between said second and said third compartments to direct said lighter twice screened, desanded and desilted liquid mud past said second opening; and said lighter twice screened, desanded and desilted liquid mud is discharged from said first desilting means into said second compartment at a higher pressure than said twice screened and desanded liquid mud discharged into said first compartment by said second vibratory screen separator, and at a higher pressure than said once screened and desanded liquid mud entering said second compartment through said first opening; whereby said mixture of said lighter once screened and desanded liquid mud faction and said twice screened and desanded liquid mud in said second compartment is prevented from passing through said second opening by said discharged lighter twice screened, desanded and desilted liquid mud faction and settles to a surface of said second compartment to be drawn therefrom by said second pump means and processed by said first desilter in a closed loop while said lighter twice screened, desanded and desilted liquid mud faction is displaced and passes through said second opening into said third compartment.

5. The apparatus according to claim 4 wherein said second compartment has an inclined wall which slopes downwardly and a conduit having one end disposed near said inclined wall and another end connected with said second pump means intake to facilitate the evacuation of said twice screened and desanded liquid mud from said second compartment.

6. The apparatus according to claim 2 wherein said enclosure modules a fourth compartment;

said third and fourth compartments are separated by a third common wall having a third opening between said third and fourth compartments at a predetermined level;

said lighter twice screened, desanded and desilted liquid mud entering said third compartment through said second opening is mixed with said thrice screened, desanded and desilted liquid mud discharged into said second compartment by said third vibratory screen separator;

said liquid overflow discharge means of said second desilting means has an outlet end disposed in said third compartment closely adjacent said third opening between said third and fourth compartments to direct said lighter thrice screened, desanded and twice desilted liquid mud faction past said third opening; and said lighter thrice screened, desanded and twice desilted liquid mud is discharged from said second desilting means into said third compartment at a higher pressure than said thrice screened, desanded and once desilted liquid mud discharged into said first compartment by said third vibratory screen separator, and at a higher pressure than said lighter twice screened, desanded and desilted liquid mud entering said third compartment through said second opening; whereby said mixture of said lighter twice screened, desanded and desilted liquid mud and said twice screened, desanded and desilted liquid mud in said third compartment is prevented from passing through said third opening by said discharged lighter thrice screened, desanded and twice desilted liquid mud faction and settles to a surface of said third compartment to be drawn therefrom by said third pump means and processed by said second desilter in a closed loop while said lighter thrice screened, desanded and twice desilted liquid mud faction is displaced to a higher level and passes through said third opening into said fourth compartment for use in an active mud system.

7. The apparatus according to claim 6 wherein said third compartment has an inclined wall and a conduit having one end disposed near said inclined wall and another end connected with said third pump means intake to facilitate the evacuation of said thrice screened, desanded and desilted liquid mud from said third compartment.

8. The apparatus according to claim 6 wherein said lighter thrice screened, desanded and twice desilted liquid mud faction entering said fourth compartment through said third opening is mixed with said four times screened, desanded and twice desilted liquid mud discharged by said fourth vibratory screen separator for use in an active mud system.

* * * * *